UNITED STATES PATENT OFFICE.

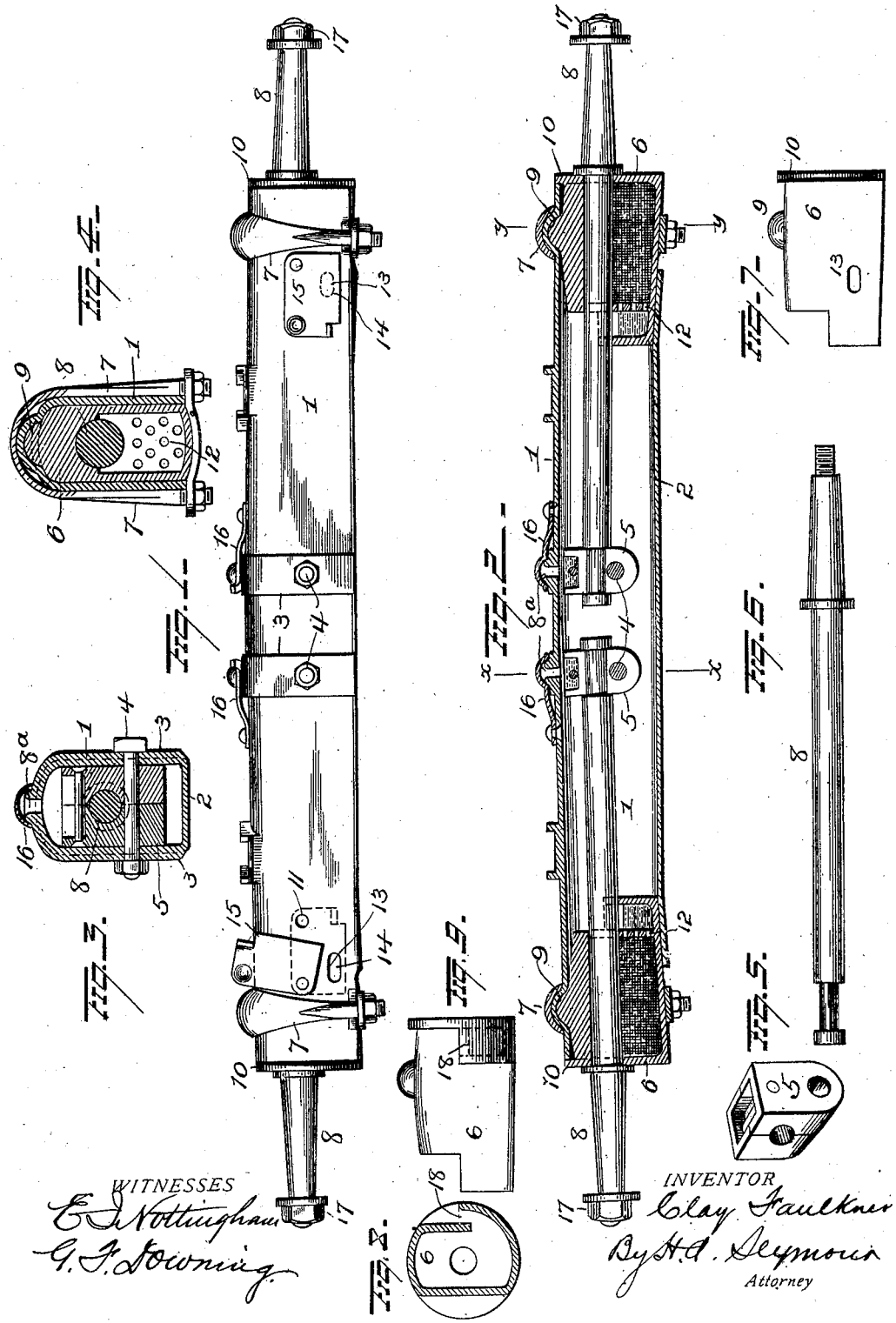

CLAY FAULKNER, OF McMINNVILLE, TENNESSEE.

ROTARY AXLE.

No. 831,219.      Specification of Letters Patent.      Patented Sept. 18, 1906.

Application filed July 27, 1905. Serial No. 271,519.

*To all whom it may concern:*

Be it known that I, CLAY FAULKNER, a resident of McMinnville, in the county of Warren and State of Tennessee, have invented certain new and useful Improvements in Rotary Axles; and I do hereby declare the following to be a full, clear, and exact description of the invention, such as will enable others skilled in the art to which it appertains to make and use the same.

My invention relates to improvements in rotary axles, the object of the invention being to provide an axle having improved construction of channel-axle support with improved bearings for the rotary-axle sections; and the invention consists in certain novel features of construction and combinations and arrangements of parts, as will be more fully hereinafter described, and pointed out in the claims.

In the accompanying drawings, Figure 1 is a view in elevation, illustrating my improvements. Fig. 2 is a view in longitudinal section. Fig. 3 is a view in section on the line $x\,x$ of Fig. 2. Fig. 4 is a view in section on the line $y\,y$ of Fig. 2, and Figs. 5, 6, and 7 are views of details of construction. Figs. 8 and 9 are views of a modification.

1 represents my improved channel-axle support of general inverted-U shape in cross-section having a closed bottom 2, which may be formed by bending inward the lower side edges or may be closed and be formed integral with the side and top wall of the support. This closed construction of support is very desirable, as it not only adds strength with less weight, but also excludes all dust and grit from the bearings.

The support 1 is reinforced at its center by two bands 3, through which bolts 4 are passed, securing center bearings 5 in the support, and the end bearings 6 are secured in the ends of the support by clips 7 and nuts, as shown.

8 represents the two revolving axle-sections, each having bearings precisely alike, and the description hereinafter given of the bearings for one axle-section will apply alike to both. The center bearing comprises two half-sections riveted together and each having semicircular bearings fitting into a recessed portion of the axle-section and having an opening to receive the securing-bolt 4, and a pocket or depression is formed in the top of the bearing to receive lubricant from a duct or opening $8^a$, normally closed by a hinged cover 16.

The end bearing, or, in other words, the bearing secured in the end of the support by clip 7, is of hollow or box formation to receive cotton-waste and lubricant, has a rounded enlargement 9 on its upper face to pivot in a recess in the support to exactly position the bearing, and has a circular flanged end 10 to close the end of the support and exclude dirt and grit. The inner end of bearing 6 is cut away, exposing an open pocket to receive lubricant through an opening 11 in support 1, and a perforated partition 12 is provided between the pocket and waste-compartment, permitting the lubricant to feed into the waste. Alined openings 13 and 14 are provided in the sides of bearing 6 and support 1, respectively, normally closed by hinged cover 15, through which the waste can be inserted and removed from the bearing, and a hinged cover 15 on channel-support 1 is adapted to close both openings 11 and 14.

The axle-sections 8 are made tapering at their outer ends to permit the nuts 17 to securely clamp the wheels thereon, yet permit the removal of the wheel should occasion require.

A modified form of bearing is shown in Figs. 8 and 9, in which a pocket 18 is cast integral with the bearing and on the side thereof at its flanged end, and this pocket enables the operator to readily insert or remove waste from the bearing and supply the same with lubricant. The sand-band of the wheel turning about the flanged end of the bearing also closes the pocket 18.

Having fully described my invention, what I claim as new, and desire to secure by Letters Patent, is—

1. In an axle structure, the combination of a tubular channel having permanently closed sides, top and bottom and open at its ends, bearing-blocks in said open ends, axle-sections and removable bearing-blocks in said channel for the inner ends of the axle-sections.

2. In an axle, the combination with an axle-support, of two axle-sections, center and end bearings in the support, metal reinforcing-bands near the center of the support, and bolts passed through the bands securing the center bearings in place.

3. A center bearing for a revolving axle-section, comprising two members to receive the recessed portion of an axle-section, and a fastening device permanently securing said bearing members together on the axle-section.

4. In an axle structure, the combination with a tubular support permanently closed except at its ends, of removable bearing-blocks secured in the ends of said tubular support, axle-sections mounted in said bearing-blocks, and having annular recesses near their inner ends, sectional bearing-blocks to receive the recessed portions of the axle-sections, fastening means permanently uniting the sections of each sectional bearing, and means for securing said sectional bearings in place within the tubular support.

5. In an axle the combination with a hollow support and end bearings closing the ends of said support, the said end bearings each having a waste-receptacle and a communicating lubricant-pocket at one end of the waste-receptacle, of revolving axles mounted in said end bearings, and removable bearings located within the hollow support and engaging and supporting the inner ends of the revolving axles.

6. In an axle the combination with a hollow support or body, end bearings having flanged ends closing said support, the said end bearings each having a waste-receptacle and a communicating lubricant-pocket, and a cover hinged to the hollow support and closing inlets to the pocket and receptacle of each end bearing, of revolving axles mounted in each end bearing and removable bearings located within the hollow support and engaging and supporting the inner ends of the revolving axles.

7. In an axle, the combination with a hollow support having integral sides, top and bottom open at its ends and provided with curved recesses on the inner face of its top near its ends the bottom of the support cut away and depressed at its ends, of end bearings each having a curved shoulder resting within a curved recess in the support, and also provided with a waste-receptacle and a communicating lubricant-pocket, a revolving axle mounted in each end bearing, bearings located within the hollow support and engaging the inner ends of the axles, and means for detachably securing said inner bearings in place.

8. In an axle, the combination with a hollow support and end bearings thereon, the latter being provided with lubricant-receptacles, of a revolving axle in each end bearing, an inner bearing for each revolving axle the said inner bearings being made in sections permanently secured together and to the axle-sections, each inner bearing having a lubricant-holding recess in its upper face, and means for securing said inner bearings and the revolving axles connected thereto, to said support.

9. In an axle, the combination with a hollow support and end bearings therein, of revolving axles mounted in the end bearings, inner bearings, each made in half-sections embracing and engaging the inner ends of a revolving axle and permanently secured together, a lubricator-holding recess in the top of each inner bearing, and means for securing said inner bearings and their attached axles to the hollow support.

In testimony whereof I have signed this specification in the presence of two subscribing witnesses.

CLAY FAULKNER.

Witnesses:
   W. F. ELKINS,
   S. T. WEST.